G. C. BATES.
TWO SPEED MOWER.
APPLICATION FILED JUNE 25, 1914.
1,117,763.
Patented Nov. 17, 1914.
2 SHEETS—SHEET 2.
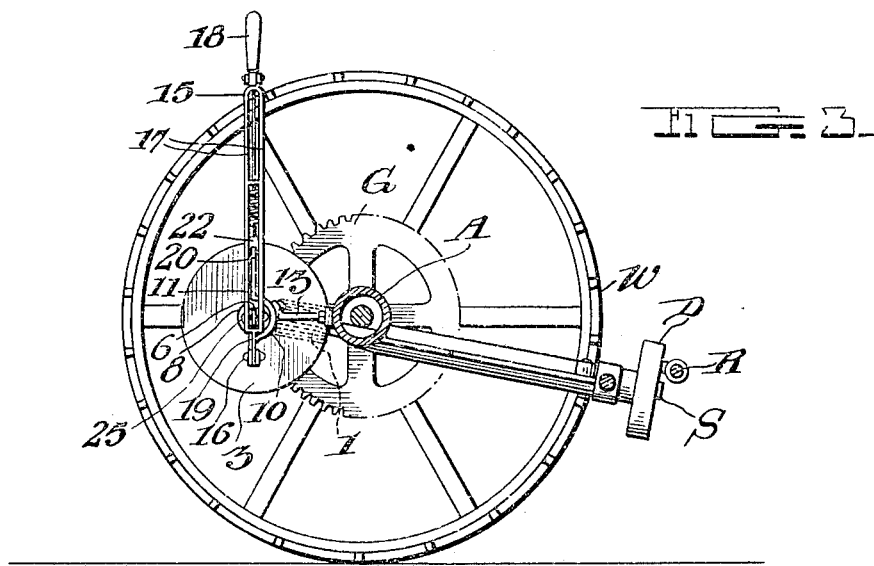
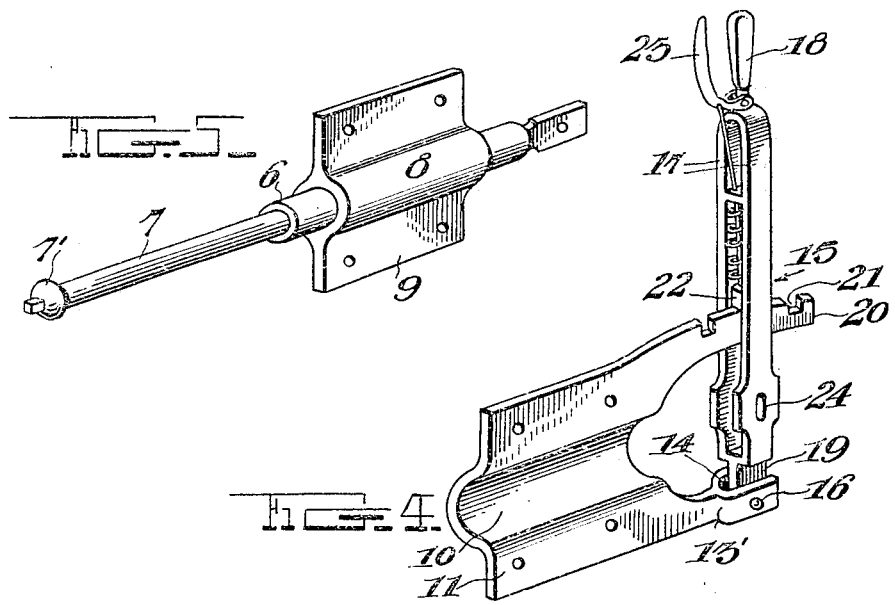
Inventor
Grover C. Bates
Witnesses
H. Woodard
By H. R. Wilson Yeo
Attorneys

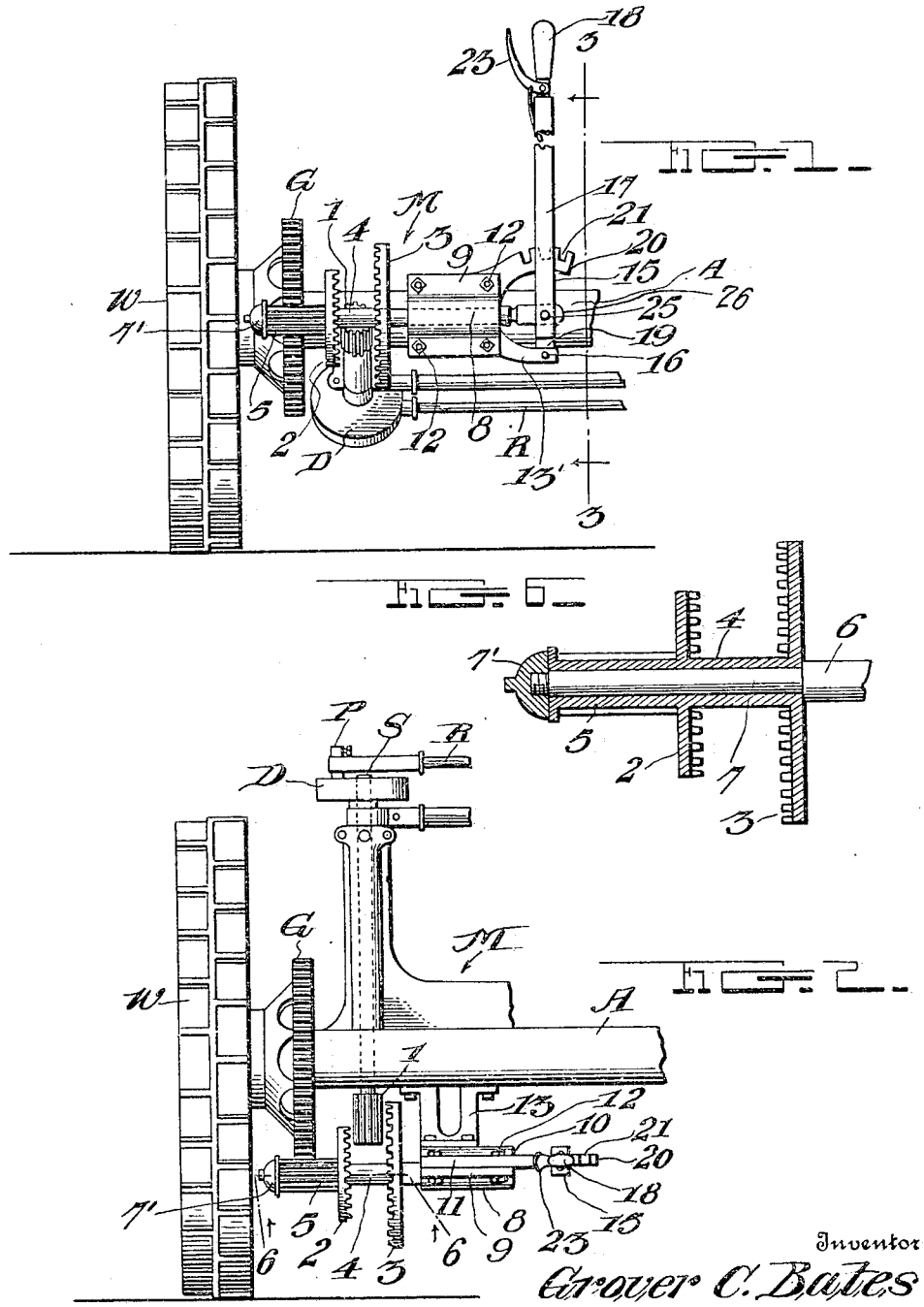

UNITED STATES PATENT OFFICE.

GROVER C. BATES, OF BEARDSTOWN, TENNESSEE.

TWO-SPEED MOWER.

1,117,763.  Specification of Letters Patent.  Patented Nov. 17, 1914.

Application filed June 25, 1914. Serial No. 847,236.

*To all whom it may concern:*

Be it known that I, GROVER C. BATES, a citizen of the United States, residing at Beardstown, in the county of Perry and State of Tennessee, have invented certain new and useful Improvements in Two-Speed Mowers; and I do declare the following to be a full, clear, and exact description of the invention, such as will enable others skilled in the art to which it appertains to make and use the same.

My invention relates to improvements in mowing machines and has for its primary object to provide simply constructed means whereby the sickle bar may be driven at a low or high speed.

In carrying out the above end, a secondary object of the invention becomes to construct a portion of the device in such a manner as to cause the same to provide a support for a sliding shaft, a pivotal support for a lever to actuate said shaft and a segmental rack for locking said lever against movement.

With these objects in view, the invention resides in certain novel features of construction and combination herein described and claimed and shown in the drawings wherein:—

Figure 1 is a rear elevation of a portion of a mowing machine showing the application of the improved parts thereto; Fig. 2 is a plan view of portions of the parts shown in Fig. 1; Fig. 3 is a longitudinal section taken on the line 3—3 of Fig. 1; Fig. 4 is a perspective view of the attaching plate and the lever pivoted thereto; Fig. 5 is a similar view of the bearing and the slidable shaft therein; and Fig. 6 is a vertical section taken along the plane of the line 6—6 of Fig. 2.

In the accompanying drawings, I have shown a portion of a mower M which includes the usual drive wheels W, supporting axle A, cutter operating shaft S extending longitudinally from the axle A, pitman rod R pivotally connecting the sickle bar (not shown) with the wrist pin P on the driving disk D which is keyed to the forward end of the shaft S as is common with devices of this character. A drive gear G is also provided which is here shown as being located adjacent the left wheel of the machine, said gear being driven by said wheel in a well-known manner. As is common with devices of this character, the shaft S extends a suitable distance in rear of the axle A, said rearwardly extending portion being here shown as provided with an elongated pinion 1 with which a small crown gear 2 or a larger crown gear 3 is adapted to mesh, said gears being formed integrally with a sleeve 4 and lying on opposite sides of the pinion 1, the outer end of said sleeve being formed into an elongated pinion 5 which meshes at all times with the drive gear G.

As clearly shown in the various figures of the drawings, the sleeve 4 and the parts formed thereon are revolubly mounted on a transverse shaft 6 having one end reduced as at 7 for its reception, the opposite or inner end portion of said shaft being slidably mounted in a cylindrical bearing 8 which is provided, on its upper and lower sides, with attaching flanges 9.

As most clearly seen in Fig. 3, the forward side of the bearing 8 is received in a semi-cylindrical recess 10 which opens through the inner and outer ends of an upright plate 11 disposed transversely of the machine. When in this position, the flanges 9 contact with the rear side of the plate 11 and suitable fastening bolts 12 are passed through these parts for the purpose of removably securing the bearing 8 upon the plate 11. The plate 11 may be secured to the axle A of the mower by any suitable means indicated at 13 in the drawings. By the above described mounting, it will be seen that the shaft 6 is free to shift laterally within the bearing 8, this movement also shifting the sleeve 4, the gears 2 and 3 and the pinion 5, these parts being revolubly mounted upon the reduced end 7 of said shaft and secured in position thereon by a nut 7'.

By reference, more particularly to Figs. 1 and 4, it will be seen that the inner edge of the plate 11 is provided with an inwardly projecting ear 13 whose outer end is preferably bifurcated as at 14 to receive the lower end of a lever 15 which is pivoted between said ears as indicated at 16, said lever being composed of a pair of upright spaced bars 17 which are united at their upper and lower ends and formed respectively into an operating handle 18 and a depending pivot lug 19 which constitutes the lower end of the lever and which is pivoted in the bifurcated end of the ear 13. The lever is constructed in the above set forth manner in order that the same may straddle a segmental rack bar 20 which is formed integrally with the upper edge of the plate 11 from which it projects inwardly, the notches 21 in said segmental rack 20, coacting with a spring projected pawl 22 which is located between the parallel sides 17 of the lever 15 and which may be retracted by a suitable thumb lever 23. It is to be noted that the portion of the lever, lying between the ear 13' and the segmental rack 20 is slotted vertically as at 24, these slots receiving a pin 25 which projects through an opening in an ear 26 which is formed integrally with the inner end of the shaft 6, thereby allowing the entire shaft to be shifted laterally within the bearing 8 by proper actuation of the lever 15. It may here be explained that the construction of the segmental rack 20 is such as to allow the lever to be locked in any one of three positions, thus allowing the shaft 6 to be locked against movement when both of the gears 2 and 3 are out of mesh with the pinion 1 or allowing the same to be locked when either of said gears meshes with said pinion.

From the foregoing description, taken in connection with the accompanying drawings, it will be seen that I have produced an extremely simple structure which may be employed for converting an ordinary one speed mower into a two speed machine and that although this structure is extremely simple, it readily performs the function for which it is designed.

It is to be noted that the upright plate 10 forms a rigid support for the bearing 8 and therefore, for the shaft 6, constitutes a pivotal support for the lever 15 and includes locking means for locking said lever in adjusted position.

Having described my invention, what I claim as new and desire to secure by Letters Patent is:

1. The combination with a mowing machine having a longitudinal cutter operating shaft and a driving gear rotatable in a plane parallel to its wheels, of an upright plate secured to the rear portion of the mower and carrying a transverse bearing located in rear of said operating shaft, a segmental rack formed on one edge of said plate, a transverse shaft slidably mounted in said bearing and lying in rear of the drive gear, an elongated pinion on said transverse shaft and meshing with said drive gear, a pinion on the rear end of the operating shaft, small and large gears located respectively on opposite sides of said last mentioned pinion and revolubly mounted on said transverse shaft, said gears and the elongated pinion rotating as a single unit, and a lever pivoted to a portion of said plate and to said transverse shaft, said lever having a pawl coacting with said segmental rack.

2. The combination with a mower having a cutter operating shaft, driving means for said shaft, mechanism for controlling the speed of said shaft, and a sliding shaft for actuating said controlling means, of an upright plate secured to the mower, a bearing carried by said plate and slidably supporting said sliding shaft, a segmental rack formed on one edge of said plate, and a lever pivoted to a portion of said plate and to said sliding shaft, said lever having a pawl coacting with said segmental rack.

3. The combination with a mower having a cutter operating shaft, driving means for said shaft, mechanism for controlling the speed of said shaft, and a sliding shaft for actuating said controlling means, of an upright plate secured to a portion of the mower, a bearing supported by said plate and slidably supporting said sliding shaft, a pivot ear formed on one edge of said plate, a segmental rack formed on the opposite edge of said plate, said ear and said rack projecting in the same direction, and a lever pivoted to said ear and to said sliding shaft, said lever having a pawl coacting with said segmental rack.

4. The combination with a mower having a cutter operating shaft, driving means for said shaft, mechanism for controlling the speed of said shaft, and a sliding shaft for actuating said controlling means, of a substantially rectangular upright plate secured to said mower and having a substantially semi-cylindrical recess, a cylindrical bearing positioned in said recess and having attaching means secured to said plate, said bearing slidably supporting said sliding shaft, an outwardly extending ear on one of the lower corners of said plate, an outwardly extending segmental rack on the corner of said plate directly above said ear, and a lever pivoted to said ear and to said sliding shaft, said lever having a pawl coacting with said segmental rack.

5. The combination with a mower having a cutter operating shaft, driving means for said shaft, mechanism for controlling the speed of said shaft, and a sliding shaft for actuating said controlling means, of a cylindrical bearing slidably supporting said sliding shaft and having upper and lower attaching flanges, an upright plate secured to the machine and having a substantially semi-cylindrical recess receiving a portion of said bearing, fastening means passing through the flanges on said bearing and through the upper and lower portions of the plate, an outwardly extending pivot ear formed on one of the lower corners of said plate, a segmental rack formed on the upper corner of said plate directly above said ear, and a lever pivoted to said ear and to said sliding shaft, said lever having a pawl coacting with said segmental rack.

In testimony whereof I have hereunto set my hand in presence of two subscribing witnesses.

GROVER C. BATES.

Witnesses:
H. W. SHEPARD,
C. N. DANIEL.

Copies of this patent may be obtained for five cents each, by addressing the "Commissioner of Patents, Washington, D. C."